US011870879B1

(12) United States Patent
Adeel et al.

(10) Patent No.: US 11,870,879 B1
(45) Date of Patent: Jan. 9, 2024

(54) DEVICE COMMUNICATION DURING EMERGENT CONDITIONS

(71) Applicants: Getac Technology Corporation, New Taipei (TW); WHP Workflow Solutions, Inc., North Charleston, SC (US)

(72) Inventors: Muhammad Adeel, Edina, MN (US); Thomas Guzik, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 18/093,299

(22) Filed: Jan. 4, 2023

(51) Int. Cl.
| | |
|---|---|
| *H04L 69/18* | (2022.01) |
| *H04W 84/18* | (2009.01) |
| *H04W 88/04* | (2009.01) |
| *G08B 25/00* | (2006.01) |
| *H04W 8/00* | (2009.01) |
| *H04L 41/12* | (2022.01) |
| *G08B 21/02* | (2006.01) |
| *H04L 67/1061* | (2022.01) |

(Continued)

(52) U.S. Cl.
CPC .......... *H04L 69/18* (2013.01); *G08B 21/0277* (2013.01); *G08B 25/004* (2013.01); *H04L 41/12* (2013.01); *H04L 67/1061* (2013.01); *H04W 8/005* (2013.01); *H04W 84/18* (2013.01); *H04W 88/04* (2013.01); *G08B 13/19656* (2013.01); *G08B 25/016* (2013.01)

(58) Field of Classification Search
CPC .......... G08B 13/19656; G08B 21/0277; G08B 25/004; G08B 25/009; G16Y 20/10; G16Y 40/50; H04W 8/005; H04W 84/18–22; H04L 41/12; H04L 67/12–125; H04L 67/535; H04L 67/104–1048; H04L 67/1061–1072; H04L 69/18
See application file for complete search history.

(56) References Cited

U.S. PATENT DOCUMENTS

| | | | |
|---|---|---|---|
| 7,403,744 B2 * | 7/2008 | Bridgelall | H04W 4/203 455/456.2 |
| 8,665,087 B2 * | 3/2014 | Greene | G08B 25/016 340/539.11 |

(Continued)

*Primary Examiner* — Brendan Y Higa

(57) ABSTRACT

Methods, systems, and apparatus, including computer programs encoded on a computer storage medium, to manage device communications during emergent conditions are disclosed. In one aspect, a method includes the actions of receiving, by a first computing device, data indicating that a second computing device is configured to communicate using a first protocol. The actions include receiving data indicating that a third computing device is configured to communicate using the first protocol and a second protocol. The actions include determining that the second computing device is unable to communicate with a fourth computing device. The actions include determining a context. The actions include generating an instruction for the third computing device to communicate with the second computing device using the first protocol. The actions include outputting, to the third computing device, the instruction for the third computing device to communicate with the second computing device using the first protocol.

20 Claims, 3 Drawing Sheets

(51) Int. Cl.
G08B 13/196 (2006.01)
G08B 25/01 (2006.01)

(56) References Cited

U.S. PATENT DOCUMENTS

| | | | | |
|---|---|---|---|---|
| 9,489,506 | B2 * | 11/2016 | Tyson | H04B 7/14 |
| 2005/0201300 | A1 * | 9/2005 | Bridgelall | H04W 40/246 |
| | | | | 370/254 |
| 2009/0059816 | A1 * | 3/2009 | Reza | H04W 28/021 |
| | | | | 370/256 |
| 2011/0090841 | A1 * | 4/2011 | Shyy | H04W 88/04 |
| | | | | 370/319 |
| 2014/0036683 | A1 * | 2/2014 | Krishnamurthy | H04W 40/04 |
| | | | | 370/254 |
| 2014/0300483 | A1 * | 10/2014 | Guo | G08B 21/0277 |
| | | | | 340/686.6 |
| 2014/0320311 | A1 * | 10/2014 | Huang | H04W 4/38 |
| | | | | 340/870.09 |
| 2017/0289329 | A1 * | 10/2017 | Yim | H04M 1/72412 |
| 2017/0310553 | A1 * | 10/2017 | Welters | H04W 48/10 |
| 2019/0045346 | A1 * | 2/2019 | Macieira | H04W 72/02 |
| 2019/0174208 | A1 * | 6/2019 | Speicher | G06F 1/163 |
| 2019/0197863 | A1 * | 6/2019 | Kao | G08B 21/0272 |
| 2019/0207819 | A1 * | 7/2019 | Sathya | H04W 84/18 |
| 2019/0266873 | A1 * | 8/2019 | Garruzzo | A61B 5/746 |
| 2019/0273777 | A1 * | 9/2019 | Virani | H04L 67/303 |
| 2020/0107241 | A1 * | 4/2020 | Ramisetti | H04B 17/318 |
| 2021/0235248 | A1 * | 7/2021 | Juntunen | H04W 4/38 |
| 2022/0286833 | A1 * | 9/2022 | Khalid | H04W 4/70 |
| 2022/0408257 | A1 * | 12/2022 | Damm | H04W 12/106 |

* cited by examiner

DEVICE COMMUNICATION DURING EMERGENT CONDITIONS

TECHNICAL FIELD

This specification generally relates to remotely controlling the communication functions of devices.

BACKGROUND

Police officers carry various types of equipment on their person and in their vehicles. Each of these devices may perform various functions. For example, a body camera may be configured to record audio and video. A radio may be configured to transmit and receive audio. A mobile phone may be configured to transmit and receive data over a network.

SUMMARY

A police officer carries multiple devices on his or her person in the course of duty. These devices may be connected such that they form a personal area network for the officer. Often, wireless communication by a portable device will significantly impact the device's power levels, potentially leading to an inability to function for an officer's entire shift.

A hub is communicatively coupled to the various connected devices in the officer's personal area network. The hub is aware of the functionality of the various connected devices in the personal area network. The hub may be located in a vehicle of the officer or on the officer's person. The hub may maintain intelligent and optimal communication with the officer's devices, as well as dispatch, and potentially with other officers. Power can be saved through device management by the hub utilizing the least power-consuming communication protocol to fully carry out the function of the device. The connected devices may be configured to communicate using short range radio, or some other low power communication protocol. Other connected devices may be configured to utilize higher power-consuming protocols. When the communication functionality is needed on a connected device that functionality is enabled. However, if the connected device has only low-power communication abilities and is outside of the range of other devices or repeaters, the hub can coordinate the communication of a low-power device, e.g., a device that has only a low powered communication protocol with limited range, through a high-power device, e.g., a device that has a low and high-powered communication protocol, to act as a real-time relay for the low-powered device.

The utilization of a connected device to relay communication of a low-powered device may be based on the context. The context may include when the officer is associated with an event and/or within a geographic and temporal proximity of an event and/or when the current context/environment of the officer corresponds to a high priority, or high-risk situation, etc. For example, there may be a need to stream video content captured by a low-power body camera of an officer as it occurs while the body camera is outside the body camera's communication range with the hub. In this example, the hub may cause another connected device of the officer, or another officer, to act as a relay.

An innovative aspect of the subject matter described in this specification may be implemented in methods that include the actions of receiving, by a first computing device, data indicating that a second computing device is configured to communicate using a first communication protocol; receiving, by the first computing device, data indicating that a third computing device is configured to communicate using the first communication protocol and a second communication protocol; determining, by the first computing device, that the second computing device is unable to communicate with a fourth computing device; determining, by the first computing device, a context of a user of the second computing device; based on determining that the second computing device is unable to communicate with the fourth computing device and the context of the user of the second computing device, generating, by the first computing device, an instruction for the third computing device to communicate with the second computing device using the first communication protocol; and providing, for output by the first computing device and to the third computing device, the instruction for the third computing device to communicate with the second computing device using the first communication protocol.

These and other implementations can each optionally include one or more of the following features. The actions include determining, by the first computing device, a context of any of the first, second, third, or fourth computing devices that are not in a vicinity of the user of the second computing device. The action of generating the instruction for the third computing device to communicate with the second computing device using the first communication protocol is further based on the context of any of the first, second, third, or fourth computing devices that are not in a vicinity of the user of the second computing device. The actions include receiving, by the first computing device and from the fourth computing device, data indicating that the fourth computing device is unable to communicate with the second computing device. The action of determining that the second computing device is unable to communicate with a fourth computing device is based on the data indicating that the fourth computing device is unable to communicate with the second computing device.

The actions include determining, by the first computing device, that the second computing device is able to communicate with the fourth computing device; based on determining that the second computing device is able to communicate with the fourth computing device, generating, by the first computing device, an instruction for the third computing device to cease communicating with the second computing device using the first communication protocol; and providing, for output by the first computing device and to the third computing device, the instruction for the third computing device to cease communicating with the second computing device using the first communication protocol. The actions include, after providing the instruction to the third computing device to cease communicating with the second computing device using the first communication protocol: determining, by the first computing device, that the second computing device is unable to communicate with the fourth computing device; determining, by the first computing device, an additional context of the user of the second computing device; and, based on determining that the second computing device is unable to communicate with the fourth computing device and the additional context of the user of the second computing device, determining to bypass generating, by the first computing device, an additional instruction for the third computing device to communicate with the second computing device using the first communication protocol.

The instruction for the third computing device to communicate with the second computing device using the first communication protocol includes instructions for the third computing device to receive additional data from the from the second computing device using the first communication protocol and to transmit the additional data to the fourth computing device using the second communication protocol. The instruction for the third computing device to communicate with the second computing device using the first communication protocol includes a time limit for the third computing device to communicate with the second computing device using the first communication protocol.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. The hub manages connected devices in a personal area network, including suspending and activating functionality of each device in accordance with any given context and other factors. The hub maintains a messaging broker to communicate with the connected devices. The hub maintains functionality of the personal area network. The hub activates and deactivates the functionality of the connected devices based on emergent conditions. The hub enables low-powered devices to communicate with receivers that may be beyond the range of the low-powered devices. The hub manages the power of devices that have both low and high-power communication options. The hub may selectively identify a suitable high-power relay for low-power devices when necessary.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
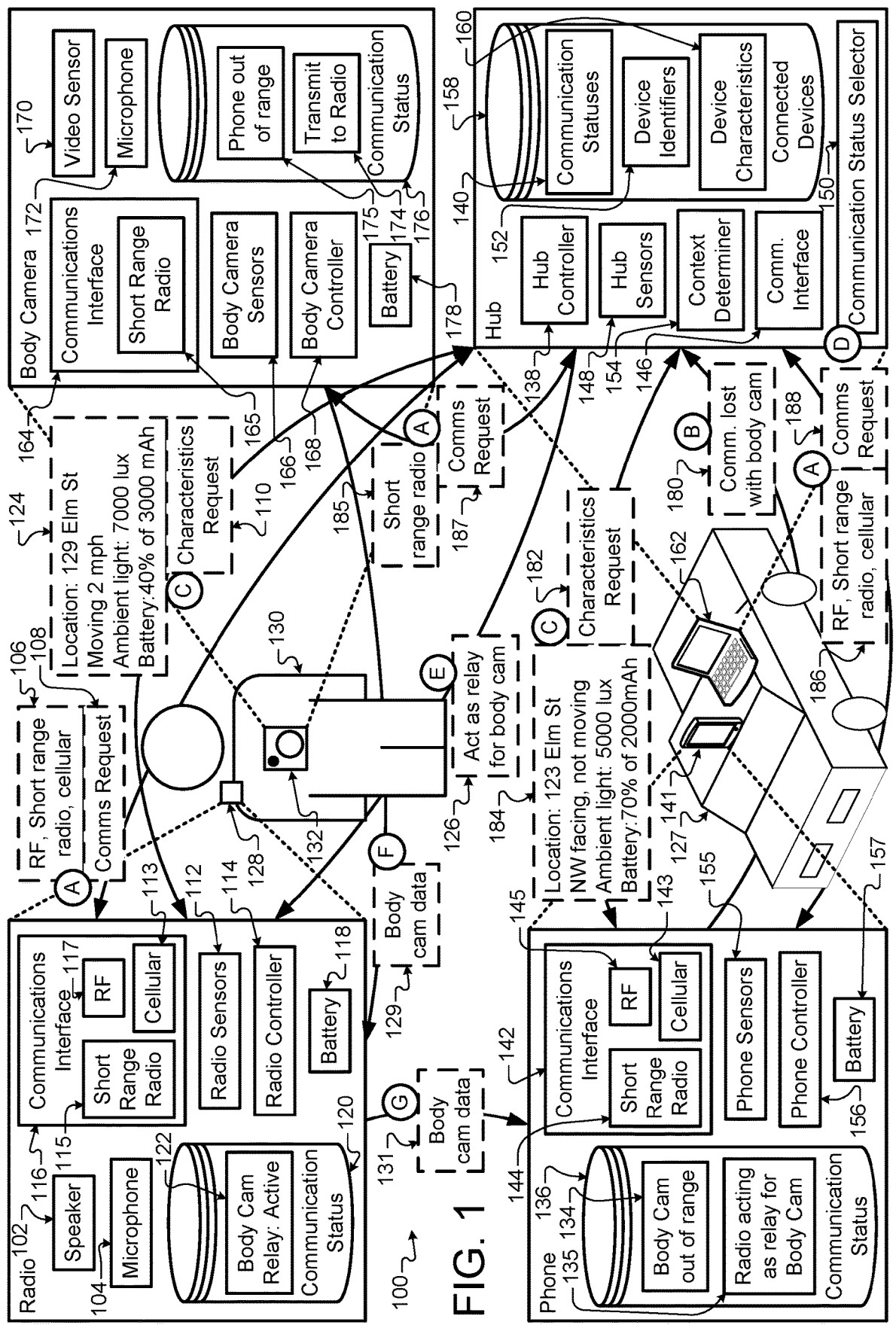
FIG. 1 illustrates an example system that is configured to manage the communication functions of various devices.

FIG. 1 illustrates an example system 100 that is configured to manage the communication functions of various devices. Briefly, and as described in more detail below, the user 130 may be utilizing multiple devices. These devices may include a body camera 132, a radio 128, a mobile phone 141, and a laptop computer 162. The laptop computer 162 may operate as a hub that is configured to manage the operations of the body camera 132, the radio 128, the mobile phone 141, and any other connected devices. The operations may include how the devices communicate with each other and with other devices. The laptop computer 162 may determine the various communication protocols that each device is configured to utilize and with which devices each device is typically configured to communicate. The laptop computer 162 may determine that a device is unable to communicate in a manner that the device is configured to. For example, the body camera 132 may be configured to transmit video data to the mobile phone 141, but the mobile phone 141 is out of range of the body camera 132. In this case, the laptop computer 162 may determine that the body camera 132 may transmit the video data to the radio 128. The radio 128 may then transmit the video data to the mobile phone 141. In some implementations, the laptop computer 162 may determine the context of any of the devices that the laptop computer 162 manages. Based on that context, the laptop computer 162 may determine whether to instruct any of the devices to change communication protocols or destination devices. FIG. 1 includes various stages A through G that may illustrate the performance of actions and/or the movement of data between various components of the system 100. The system 100 may perform these stages in any order.

In more detail, the user 130 may be a police officer who is carrying various types of equipment in the vehicle 127 of the user 130 and the body of the user 130. The equipment may include a radio 128 that includes a microphone 104, a speaker 102, and a communications interface 116. The communications interface 116 may be configured to transmit and receive voice communications using various techniques that may involve different communication modules. These communication modules may include a short range radio 115, a radio frequency communication module 117, and a cellular communication module 113. In some implementations, the communications interface 116 may include additional communication modules that may utilize wireless or wired communication techniques or protocols. The microphone 104 may be configured to detect audio and transmit that audio to the communications interface 116. The communications interface 116 may output the audio data to another device and/or a communications network. The speaker 102 may be configured to receive audio data from the communications interface 116 and output the audio data.

The radio 128 may include radio sensors 112 that are configured to detect various characteristics of the radio 128 and/or the environment of the radio 128. For example, the radio sensors 112 may include an accelerometer, a gyroscope, a GPS receiver, a barometer, an ambient light sensor, a compass, a gravity sensor, a proximity sensor, a magnetometer, hygrometer, water sensor, solar flux sensor, ultraviolet light detector, and/or any other similar sensors. The radio 128 may include a battery 118 to provide power to the various components. The radio 128 may be configured to receive power from another device such as a power supply, power adapter, and/or any other similar device. This power may be used to charge the battery 118. In some implementations, the radio 128 may provide the power to the various components of the radio 128.

The radio 128 may include a radio controller 114 that is configured to manage the various components of the radio 128. The radio controller 114 may be implemented by one or more processors executing software stored on a storage device accessible by the processors. The radio controller 114 may manage the processing of the audio data detected by the microphone before and during the communications interface 116 outputting of the processed audio data. The radio controller 114 may manage the processing of audio data received through the communications interface 116 before and during the speaker 102 outputting the received audio data. The radio controller 114 may receive the sensor data from the radio sensors 112 and provide the sensor data to the various destinations that may include the communications interface 116.

In some implementations, the radio controller 114 may select the communication module from the communication interface 116 when the communication interface 116 is preparing to transmit and/or receive data. The radio controller 114 may also be configured to select the device to which to transmit data. This selection may occur if the intended destination device is not available because the intended destination device is out of range, is powered off, has a low battery, and/or any other similar reason. The radio controller 114 may store data related to the communication interface 116 in the communication status 120. The communication status 120 may be located in a storage device or storage medium in or accessible to the radio 128. The communication status 120 may include data related to the status of other devices with which the radio 128 communicates. The status of other devices may include data indicating which ones are out of range or which devices may not be available using some of the communication modules. For example, the communication status 120 may include data indicating that the mobile phone 141 and the laptop computer 162 are unavailable using short range radio. The communication status 120 may also include whether the radio 128 is being used as an intermediary between other devices or whether the radio 128 should use a specific device as an intermediary. An intermediary device may act as a repeater or relay that receives data from a transmitting device and forwards the data to a receiving device that may not be able to communicate directly with the transmitting device.

The equipment that the user 130 may carry may also include a body camera 132. The body camera 132 may be located on the chest of the user 130. The body camera 132 may include a video sensor 170, a microphone 172, and a communications interface 164. The communications interface 164 may be configured to transmit and receive voice communications using various techniques that may involve different communication modules. These communication modules may include a short range radio 165. In some implementations, the communications interface 164 may include additional communication modules that may utilize wireless or wired communication techniques or protocols. The microphone 172 may be configured to detect audio. The video sensor 170 may be configured to generate video data. The microphone 172 and the video sensor 170 may be configured to output the audio and video data to a storage device and/or a communications network using the communications interface 164. The storage device may be located on or accessible by the body camera 132.

The body camera 132 may include body camera sensors 166 that are configured to detect various characteristics of the body camera 132 and/or the environment of the body camera 132. For example, the body camera sensors 166 may include an accelerometer, a gyroscope, a GPS receiver, a barometer, an ambient light sensor, a compass, a gravity sensor, a proximity sensor, a magnetometer, hygrometer, water sensor, solar flux sensor, ultraviolet light detector, and/or any other similar sensors. The body camera 132 may include a battery 178 to provide power to the various components. The body camera 132 may be configured to receive power from another device such as a power supply, power adapter, and/or any other similar device. This power may be used to charge the battery 178. In some implementations, the body camera 132 may provide the power to the various components of the body camera 132.

The body camera 132 may include a body camera controller 168 that is configured to manage the various components of the body camera 132. The body camera controller 168 may be implemented by one or more processors executing software stored on a storage device accessible by the processors. The body camera controller 168 may manage the processing of the audio data detected by the microphone 172 before and during the communications interface 164 outputting of the processed audio data and/or storing the audio data. The body camera controller 168 may manage the processing of video data generated by the video sensor 170 before and during the communications interface 164 outputting of the processed video data and/or storing the video data. The body camera controller 168 may receive the sensor data from the body camera sensors 166 and provide the sensor data to the various destinations that may include the communications interface 164.

In some implementations, the body camera controller 168 may select the communication module from the communication interface 164 when the communication interface 164 is preparing to transmit and/or receive data. The body camera controller 168 may also be configured to select the device to which to transmit data. This selection may occur if the intended destination device is not available because the intended destination device is out of range, is powered off, has a low battery, and/or any other similar reason. The body camera controller 168 may store data related to the communication interface 164 in the communication status 176. The communication status 176 may be located in a storage device or storage medium in or accessible to the body camera 132. The communication status 176 may include data related to the status of other devices with which the body camera 132 communicates. The status of other devices may include data indicating which ones are out of range or which devices may not be available using some of the communication modules. For example, the communication status 176 may include data indicating that the radio 128, the mobile phone 141, and/or the laptop computer 162 are unavailable using short range radio. The communication status 176 may also include whether the body camera 132 is being used as an intermediary between other devices or whether the body camera 132 should use a specific device as an intermediary. An intermediary device may act as a repeater or relay that receives data from a transmitting device and forwards the data to a receiving device that may not be able to communicate directly with the transmitting device.

The equipment that the user 130 may carry may also include a mobile phone 141. The user 130 may carry the mobile phone 141, but the mobile phone 141 may not be attached to the user 130. In this case, the user 130 may leave the mobile phone 141 in the vehicle 127 while the user 130 is away from the vehicle 127. The body camera 132 may include a communications interface 142. The communications interface 142 may be configured to transmit and receive communications and other data using various techniques that may involve different communication modules. These communication modules may include a short range radio 144, a cellular communication module 143, a radio frequency communication module 145. In some implementations, the communications interface 142 may include additional communication modules that may utilize wireless or wired communication techniques or protocols.

The mobile phone 141 may include mobile phone sensors 155 that are configured to detect various characteristics of the mobile phone 141 and/or the environment of the mobile phone 141. For example, the mobile phone sensors 155 may include an accelerometer, a gyroscope, a GPS receiver, a barometer, an ambient light sensor, a compass, a gravity sensor, a proximity sensor, a magnetometer, hygrometer, water sensor, solar flux sensor, ultraviolet light detector, video sensor, image sensor, microphone, and/or any other similar sensors. The mobile phone 141 may include a battery 157 to provide power to the various components. The mobile phone 141 may be configured to receive power from another device such as a power supply, power adapter, and/or any other similar device. This power may be used to charge the battery 157. In some implementations, the mobile phone 141 may provide the power to the various components of the mobile phone 141.

The mobile phone 141 may include a mobile phone controller 156 that is configured to manage the various components of the mobile phone 141. The mobile phone controller 156 may be implemented by one or more processors executing software stored on a storage device accessible by the processors. The mobile phone controller 156 may manage the processing of the audio data detected by a microphone before and during the communications interface 142 outputting of the processed audio data and/or storing the audio data. The mobile phone controller 156 may manage the processing of video data generated by a video sensor before and during the communications interface 142 outputting of the processed video data and/or storing the video data. The mobile phone controller 156 may manage and execute various applications on the mobile phone 141. The mobile phone controller 156 may receive sensor data from the mobile phone sensors 155 and process the sensor data and/or provide the sensor data to various destinations that may include the communications interface 164.

In some implementations, the mobile phone controller 156 may select the communication module from the communication interface 142 when the communication interface 142 is preparing to transmit and/or receive data. The mobile phone controller 156 may also be configured to select the device to which to transmit data. This selection may occur if the intended destination device is not available because the intended destination device is out of range, is powered off, has a low battery, and/or any other similar reason. The mobile phone controller 156 may store data related to the communication interface 142 in the communication status 136. The communication status 136 may be located in a storage device or storage medium in or accessible to the mobile phone 141. The communication status 136 may include data related to the status of other devices with which the mobile phone 141 communicates. The status of other devices may include data indicating which ones are out of range or which devices may not be available using some of the communication modules. For example, the communication status 136 may include data indicating that the radio 128, the body camera 132, and/or the laptop computer 162 are unavailable using short range radio. The communication status 136 may also include whether the mobile phone 141 is being used as an intermediary between other devices or whether the mobile phone 141 should use a specific device as an intermediary. An intermediary device may act as a repeater or relay that receives data from a transmitting device and forwards the data to a receiving device that may not be able to communicate directly with the transmitting device.

The equipment that the user 130 utilizes may also include a laptop computer 162. The laptop computer 162 may include various components that facilitate the laptop computer 162 operating as a hub that manages the various components that the user 130 carries and the various components that the user 130 utilizes but may not carry. In this way, the laptop computer 162 may manage the personal area network of the user 130. The personal area network may include the laptop computer 162, the mobile phone 141, the radio 128, the body camera 132, and any other devices that laptop computer 162 may be able to manage. The laptop computer 162 includes a hub controller 138. The hub controller 138 may be implemented by one or more processors executing software stored on a storage device accessible by the processors. The hub controller 138 may be configured to manage the various components of the laptop computer 162. The components may include a communications interface 146, hub sensors 148, a communication status selector 150, and a context determiner 154. The communications interface 146 may be configured to transmit and receive data using various techniques. These techniques may include radio frequency communications, Wi-Fi, short range radio, cellular communications, and/or any other similar wireless or wired communication technique. The hub controller 138 may be configured to instruct the communications interface 146 to utilize a particular communications technique and/or prevent communications using a particular communications technique. For example, the hub controller 138 may instruct the communications interface 146 to deactivate the cellular communications. As another example, the hub controller 138 may instruct the communications interface 146 to only utilize short range radio.

The hub sensors 148 may include an accelerometer, a gyroscope, a GPS receiver, a barometer, an ambient light sensor, a compass, a gravity sensor, a proximity sensor, a magnetometer, image sensor, video sensor, microphone, hygrometer, water sensor, solar flux sensor, ultraviolet light detector, and/or any other similar sensors. The hub controller 138 may be configured to activate or deactivate any of the hub sensors 148. The hub controller 138 may also be configured to provide the hub sensor data to the communications interface 146 for output, to a storage device, and/or to another component of the laptop computer 162 for further processing.

The context determiner 154 may be configured to determine the context of the laptop computer 162, any other devices communicating with the laptop computer 162, and/or the user 130. The context determiner 154 may analyze the hub sensor data, the radio sensor data, the body camera sensor data, the phone sensor data, audio data from the radio 128, video and audio data from the body camera 132, data from the mobile phone 141, and/or additional data from other devices. The context determiner 154 may determine a likely context of the laptop computer 162, the user 130, and/or any other devices communicating with the laptop computer 162 based on this analysis. The context may indicate the likely actions in which the user 130 may be participating, the activities that may likely be occurring around the user 130, the likely path of the user 130, the weather around the user 130, and/or any other similar context.

The hub controller 138 may maintain a record of the devices that the hub controller 138 manages. This record may include identifiers for each of the devices and data related to each device such as the characteristics of the devices and the functions of the devices. The laptop computer 162 may include a connected devices storage 158. The connected devices storage 158 may implemented in a storage device that is accessible by the hub controller 138. The connected devices storage 158 may include the device identifiers 152. The device identifiers 152 may include data identifying each of the devices that the laptop computer 162 is managing. In the example of FIG. 1, the device identifiers 152 may include data identifying the body camera 132, data identifying the radio 128, and data identifying the mobile phone 141.

The connected devices storage 158 may include the device characteristics 160 and the communication statuses 140 for the devices referenced in the device identifiers 152. The communication statuses 140 may include data related to the communication capabilities of the corresponding devices. The communication capabilities may include the communication modules that are included in each device. The communication statuses 140 may include data related to the devices with which each device is able to communicate. This may include the devices that are within range of each device for communication interfaces that may be limited by range, for example, wireless communication techniques. In some implementations, the communication statuses 140 may include similar information to the communication status 176 of the body camera 132, the communication status 120 of the radio 128, the communication status 136 of the mobile phone 141, and/or any other devices connected to the laptop computer 162. The communication statuses 140 may include instructions provided to connected devices related to communication techniques and protocols. These instructions may include when a device should act as an intermediary and for which other devices the device is the intermediary. The instructions may include the timing of acting as an intermediary such as the start time and/or the end time. The instructions may include a condition that indicates when to start and/or end acting as an intermediary. The instructions may be updated as the communication status selector 150 generates additional instructions. The communication statuses 140 may also include details whether the corresponding device confirmed the instructions.

The device characteristics 160 may be related to the aspects of the devices that change other than changes in communication protocols and techniques. In some implementations, the device characteristics 160 may include sensor data received from the connected devices. For example, the device characteristics 160 may include body camera sensor data, radio sensor data, mobile phone sensor data, and/or sensor data from other connected devices. The device characteristics 160 may also include sensor data collected by the hub sensors 148.

In stage A, the hub controller 138 may access the device identifiers 152 and determine that the radio 128, the body camera 132, and the mobile phone 141 are communicating with the laptop computer 162. The hub controller 138 may determine that the communication statuses 140 may not include data indicating the various communication capabilities of the body camera 132, the mobile phone 141, and the radio 128. In some implementations, the hub controller 138 may determine that the device functions 140 for the radio 128, the mobile phone 141, and/or the body camera 132 have not been updated in a threshold period of time. The hub controller 138 may attempt to communicate with each of the devices. The hub controller 138 may generate a communication request to each of the devices. The hub controller 138 may generate a communication request 188 and provide the communication request 188 to the communications interface 146 along with instructions to provide the communication request 188 to the mobile phone 141. The communications interface 146 may attempt to transmit the communication request 188 using various communication techniques in an attempt to communicate with the mobile phone 141. The communications interface 142 receives the communication request 188 and provides the communication request 188 to the mobile phone controller 156. The mobile phone controller 156 determines that the communication techniques of the mobile phone 141 are short range radio, radio frequency communications, and cellular communication. The mobile phone controller 156 may generate the communication response 186 that indicates these communication techniques. The mobile phone controller 156 may provide the communication response 186 to the communication interface 142 that then provides the communication response 186 to the communication interface 146 of the laptop computer 162. The hub controller 138 stores the communication response 186 in the communication statuses 140. The communication statuses 140 then indicate that the mobile phone 141 has the capability of communicating using short range radio, cellular, and radio frequency. In some implementations, the exchange of the communication request 188 and the communication response 186 may occur when the devices that include the laptop computer 162 and the mobile phone 141 are assigned to the user 130.

The hub controller 138 may generate a communication request 108 and provide the communication request 108 to the communications interface 146 along with instructions to provide the communication request 108 to the radio 128. The communications interface 146 transmits the communication request 108 to the radio 128. The communications interface 116 receives the communication request 108 and provides the communication request 108 to the radio controller 114. The radio controller 114 determines that the communication techniques of the radio 128 are short range radio, radio frequency communications, and cellular communication. The radio controller 114 may generate the communication response 106 that indicates these communication techniques. The radio controller 114 may provide the communication response 106 to the communication interface 116 that then provides the communication response 106 to the communication interface 146 of the laptop computer 162. The hub controller 138 stores the communication response 106 in the communication statuses 140. The communication statuses 140 then indicate that the radio 128 has the capability of communicating using short range radio, cellular, and radio frequency. In some implementations, the exchange of the communication request 108 and the communication response 106 may occur when the devices that include the laptop computer 162 and the radio 128 are assigned to the user 130.

The hub controller 138 may generate a communication request 110 and provide the communication request 187 to the communications interface 146 along with instructions to provide the communication request 187 to the body camera 132. The communications interface 146 transmits the communication request 187 to the body camera 132. The communications interface 164 receives the communication request 110 and provides the communication request 187 to the body camera controller 168. The body camera controller 168 determines that the communication technique of the body camera 132 is short range radio. The body camera controller 168 may generate the communication response 185 that indicates this communication technique. The body camera controller 168 may provide the communication response 185 to the communication interface 164 that then provides the communication response 185 to the communication interface 146 of the laptop computer 162. The hub controller 138 stores the communication response 185 in the communication statuses 140. The communication statuses 140 then indicate that the body camera 132 has the capability of communicating using short range radio. In some implementations, the exchange of the communication request 187 and the communication response 185 may occur when the devices that include the laptop computer 162 and the body camera 132 are assigned to the user 130.

In some implementations, the communication response 185 and/or the communication response 186 may indicate that the body camera 132 is configured to transmit the video and audio data to the mobile phone 141, and the mobile phone 141 transmits the video and audio data to the destination requested by the body camera 132. In this way, the communication response 185 and/or the communication response 186 indicates that the mobile phone 141 is the intermediary of the body camera 132. In some implementations, the communication response 185 and/or the communication response 186 may indicate that the mobile phone 141 is the intermediary for the body camera 132 in instances when the body camera 132 is unable to communicate with the device that the body camera 132 intends to transmit audio and/or video data.

In some implementations, the hub controller 138 analyzes the communication statuses 140 and determines that the mobile phone 141 should act as the intermediary for the body camera 132. The hub controller 138 may determine that the body camera 132 is only able to communicate using short range radio. Based on this, the hub controller 138 may identify the mobile phone 141 or the radio 128 as devices that can act as intermediaries for the body camera 132. In this case, the hub controller 138 may transmit an instruction to the mobile phone 141 to act as the intermediary for the body camera 132 and an instruction to the body camera 132 to utilize the mobile phone 141 as an intermediary. These instructions may be stored in the communication status 176 of the body camera 132 and the communication status 136 of the mobile phone 141.

The user 130 may be in the vehicle 127. In this case, the body camera 132 may be in the vicinity of the mobile phone 141 if the body camera 132 needs to use the mobile phone 141 as an intermediary. In some implementations, the user 130 may not be in the car. Instead, the user 130 may be carrying the mobile phone 141 while wearing the body camera 132. In stage B, the user 130 may be separated from the mobile phone 141. This may occur if the user 130 leaves the vehicle 127 and the mobile phone 141 remains in the vehicle 127.

After the user 130 leaves the vehicle 127, the mobile phone 141 and the body camera 132 may be unable to communicate. This inability to communicate may be because the mobile phone 141 is out of range of the short range radio 165 of the body camera 132. When the mobile phone 141 detects that the mobile phone 141 is no longer connected to the body camera 132 over short range radio, the mobile phone controller 156 may generate a communication notice 180 that indicates that the mobile phone. The mobile phone controller 156 may provide the communication notice 180 to the communications interface 142. The phone controller 156 may also store body camera communication status data 134 in the communication status 136. The body camera communication status data 134 may indicate that the mobile phone 141 us unable to communicate with the body camera 132.

The communication interface 146 of the laptop computer 162 may receive the communication notice 180. The hub controller 138 may update the communication statuses 140 based on the communication notice 180. The hub controller 138 may store data indicating that the body camera 132 and the mobile phone 141 are unable to communicate.

In some implementations, the hub controller 138 may determine that the radio 128 is able to act as an intermediary for the body camera 132 while the body camera 132 is unable to communicate with the mobile phone 141. In this case, the hub controller 138 may instruct the radio 132 to act as an intermediary for the body camera 132. The hub controller 138 may also notify the mobile phone 141 that the radio 132 is acting as an intermediary for the body camera 132 while the mobile phone 141 is unable to communicate with the body camera 132.

In some implementations, the hub controller 138 may not automatically instruct the radio 128 to act as an intermediary for the body camera 132 in instances when the body camera 132 is unable to communicate with the mobile phone 141. Instead, the hub controller 138 may determine the context of the user 130, the body camera 132, the radio 128, the laptop computer 162, and/or the mobile phone 141 to determine whether to instruct the radio 128 to act as an intermediary for the body camera 132. Based on that context, the hub controller 138 may determine whether to instruct the radio 128 to act as an intermediary for the body camera 132 or bypass instructing the radio 128 to act as an intermediary for the body camera 132. If the hub controller 138 bypasses instructing the radio 128 to act as an intermediary for the body camera 132, then the body camera 132 may be unable to output audio and/or video data for the period of time while the body camera 132 is unable to communicate with the mobile phone 141.

In stage C, the hub controller 138 may request data to determine the context of the user 130, the body camera 132, the radio 128, the laptop computer 162, and/or the mobile phone 141. This determination may involve analyzing the characteristics of the user 130, the body camera 132, the radio 128, the laptop computer 162, and/or the mobile phone 141. The hub controller 138 may access the device characteristics 160 to determine whether the device characteristics for the body camera 132, the radio 128, the laptop computer 162, and/or the mobile phone 141 have been updated within a threshold period of time. If the hub controller 138 determines that the device characteristics for the body camera 132, the radio 128, the laptop computer 162, and/or the mobile phone 141 have been updated within a threshold period of time, then the hub controller 138 may instruct the context determiner 154 to determine the context of the user 130, the body camera 132, the radio 128, the laptop computer 162, and/or the mobile phone 141. If the determines that the device characteristics for the body camera 132, the radio 128, the laptop computer 162, and/or the mobile phone 141 have not been updated within a threshold period of time, then the hub controller 138 may update the device characteristics 160.

In some implementations, the hub controller 138 may determine with which devices the laptop computer 162 is capable of communicating. The hub controller 138 may access the communication statuses 140. Based on accessing the communication statuses 140, the hub controller 138 may determine that the communications interface 146 can communicate with the mobile phone 141 using short range radio, radio frequency communications, and/or cellular communications. The hub controller 138 may determine that the communications interface 146 can communicate with the radio 128 using short range radio, radio frequency communications, and/or cellular communications. The hub controller 138 may determine that the communications interface 146 can communicate with the body camera 132 using short range radio.

The hub controller may generate a characteristics request 110 and provide the characteristics request 110 to the communications interface 146 along with instructions to provide the characteristics request 110 to the radio 128. The communications interface 146 transmits the characteristics request 110 to the radio 128 using one or more of the available communication techniques. The communications interface 116 receives the characteristics request 110 and provides the characteristics request 110 to the radio controller 114. The radio controller 114 determines that the characteristics of the radio 128 include the location of the radio 128 being 129 Elm Street, the radio 128 moving at two miles per hour, the ambient light in the vicinity of the radio 128 being seven thousand lux, and the radio battery 118 having a capacity of three thousand milliamp hours with forty percent remaining. The radio controller 114 may generate the characteristics response 124 that indicates these characteristics. In some implementations, the radio controller 114 may access the sensor data generated by the radio sensors 112 in response to receiving the characteristics request 110. For example, the radio controller 114 may determine a location of the radio 128, the movement of the radio 128, and/or any other similar environmental conditions of the radio 128. The radio controller 114 may include those conditions in the characteristics response 124.

The radio controller 114 may provide characteristics response 124 to the communications interface 116 that then provides the characteristics response 124 to the communications interface 146 of the mobile phone 162 using one or more of the available communication techniques. The hub controller 138 stores the characteristics response 124 in the device characteristics 160. The device characteristics 160 then indicate that the radio 128 is located at 129 Elm Street, is moving at two miles per hour, has ambient light in the vicinity of the radio 128 of seven thousand lux, and has the battery 118 with a capacity of three thousand milliamp hours with forty percent remaining.

The hub controller 138 may generate a characteristics request 182 and provide the characteristics request 182 to the communications interface 146 along with instructions to provide the characteristics request 182 to the mobile phone 141. The communications interface 146 transmits the characteristics request 182 to the mobile phone 141 using one or more of the available communication techniques. The communications interface 164 receives the characteristics request 182 and provides the characteristics request 182 to the mobile phone controller 156. The mobile phone controller 156 determines that the characteristics of the mobile phone 141 include the location of the mobile phone 141 being 123 Elm Street, the mobile phone 141 facing northwest and not moving, the ambient light in the vicinity of the mobile phone 141 being five thousand lux, and the battery 157 being a two thousand milliamp battery with seventy percent remaining. The mobile phone controller 156 may generate the characteristics response 184 that indicates these characteristics. In some implementations, the mobile phone controller 156 may access the sensor data generated by the mobile phone sensors 155 in response to receiving the characteristics request 182. For example, the mobile phone controller 156 may determine a location of the mobile phone 141, the movement of the mobile phone 141, and/or any other similar environmental conditions of the mobile phone 141. The mobile phone controller 156 may include those conditions in the characteristics response 184.

The mobile phone controller 156 may provide characteristics response 184 to the communications interface 164 that then provides the characteristics response 184 to the communications interface 146 of the laptop computer 162 using one or more of the available communication techniques. The hub controller 138 stores the characteristics response 184 in the device characteristics 160. The device characteristics 160 then indicate that the mobile phone 141 is located at 123 Elm Street, is facing northwest and not moving, has ambient light in its vicinity of five thousand lux, and the battery 157 is a two thousand milliamp battery with seventy percent remaining.

In some implementations, the hub controller 138 may also generate a characteristics request for the body camera 132. The communication interface 146 may attempt to transmit the characteristics request using short range radio, which is the available communication technique between the laptop computer 162 and the body camera 132. Given that the mobile phone 141 is out of range of the body camera 132 using short range radio, the laptop computer 162 is also likely out of range of the body camera 132. Because of this, the characteristics request for the body camera 132 sent by the laptop computer 162 may be received by the body camera 132. In some implementations, the hub controller 138 may determine that because the mobile phone 141 is in the vicinity of the laptop computer 162 and because the mobile phone 141 is out of range of the short range radio 165 of the body camera 132, the laptop computer 162 may be unable to communicate with the body camera 132 using short range radio. In this case, the hub controller 138 may not attempt to transmit a characteristics request to the body camera 132.

The hub controller 138 determines that the device characteristics are up to date and include data that corresponds to some devices in the device identifiers 152. The hub controller 138 may also determine that other devices in the device identifiers 152 may not include up to date device characteristics maybe because, for example, the laptop computer 162 is unable to communicate with the other devices. Based on this determination and in stage D, the hub controller 138 may instruct the context determiner 154 to determine the context of the user 130, the radio 128, the mobile phone 141, the laptop computer 162, and/or the body camera 132.

In some implementations, the hub controller 138 may instruct the context determiner 154 to determine the context of the user 130 by identifying the devices that are likely in the vicinity of the user 130. The hub controller 138 may determine that the radio 128, the body camera 132, and the mobile phone 141 are likely on the person of the user 130. The hub controller 138 may determine that the radio 128 and the mobile phone 141 are in different locations based on the device characteristics 160. The hub controller 138 may determine that the radio 128 is more likely to be on the person of the user 130 than the mobile phone 141 because the radio 128 is attached to the clothing of the user 130. Based on this determination, the hub controller 138 may instruct the context determiner 154 to determine the context of the user 130 based on the device characteristics of the radio 128.

In some implementations, the hub controller 138 may instruct the context determiner 154 to determine the context of the device that is having difficulty communicating. In this case, because the laptop computer 162 received indication from the mobile phone 141 that the body camera 132 is unable to communicate with the mobile phone 141 using short range radio, then the hub controller 138 may determine to determine the context of the body camera 132. Doing so may help the hub controller 138 determine whether the hub controller 138 should identify an alternative way for the body camera 132 to communicate. In this case, the hub controller 138 may identify the device that is likely in the vicinity of the body camera 132. The hub controller 138 may determine that the radio 128, the body camera 132, and the mobile phone 141 are likely on the person of the user 130. Therefore, the radio 128 and the mobile phone 141 are likely in the vicinity of the body camera 132. The hub controller 138 may determine that the radio 128 and the mobile phone 141 are in different locations based on the device characteristics 160. The hub controller 138 may determine that the radio 128 is more likely to be in the vicinity of the body camera 132 because the radio 128 is more likely to be on the person of the user 130 than the mobile phone 141 because the radio 128 is attached to the clothing of the user 130. Based on this determination, the hub controller 138 may instruct the context determiner 154 to determine the context of the body camera 132 based on the device characteristics of the radio 128.

The context determiner 154 may receive the request to determine the context of the body camera 132 and/or the user 130 based on the characteristics of the radio 128. In this case, the context determiner 154 may effectively determine the context of the radio 128. The context determiner 154 may access data from various devices of the user 130 and other sources. In some implementations, the context determiner 154 may bypass utilizing the device characteristics of the body camera 132 because that data may be out of date with the communication challenges of the body camera 132.

The context determiner 154 may access the hub sensor data generated by the hub sensors 148. The context determiner 154 may access the device characteristics 160 that may include sensor data collected by the sensors such as the radio sensors 112 and the mobile phone sensors 155. The context determiner 154 may also access public sources of information that may relate to news, weather, current event, public crime data, court records, and/or any other similar activity that may be affecting what is occurring in the vicinity of the radio 128, the body camera 132, the user 130, and/or any other devices of the user 130. These public sources may include websites available on the internet, public APIs, radio signals, and/or any other similar public data. The context determiner 154 may also access private data sources. The private data sources may include intranet data related to an employer of the user 130. For example, the user 130 may be a police officer and the private data may relate information related to ongoing investigations, non-public crime data, and/or any other similar internal police data.

In some implementations, the connected devices may include the built-in computer of the vehicle 127. With the vehicle 127 being a connected device, the device identifiers may include data identifying the vehicle 127 and the built-in computer of the vehicle 127. The device characteristics may include the various characteristics of the vehicle 127 and the built-in computer of the vehicle 127, which may also include sensor data collected from the various sensors of the vehicle 127 and the built-in computer of the vehicle 127. These sensors may include a speedometer, a location sensor, vehicle accessory monitors that may monitor the usage of various accessories of the vehicle 127 (such as headlights, interior lights, air conditioning systems, heating systems, audio recording and output systems, sirens, flashing lights, radar gun, license plate reader, video recording and output systems, automatic door operators, and/or any other similar vehicle accessory), battery level monitors that measure the capacity of any batteries in the vehicle 127 and the remaining power left in those batteries, a voltmeter that measures the voltage those batteries, various thermometers that measure the temperature of various components of the vehicle 127 (for example, the temperature of various portions of the batteries, various portions of the motor, the ambient temperature, and any other similar locations), a hygrometer that measures the moisture content of the ambient air and/or the air inside any component of the vehicle 127, a water sensor that may detect the presence of water in and/or around any component of the vehicle 127, and/or any other similar sensors.

The context determiner 154 may analyze each of these sources of data to determine a likely context of the user 130, the body camera 132, and/or the radio 128. The context may indicate the likely activity in which the user 130 is participating; the likely destination of the user 130, the body camera 132, and/or the radio 128; the likely path that the user 130, the body camera 132, and/or the radio 128 will take to reach the likely destination, events that are likely occurring around the user 130, the body camera 132, and/or the radio 128; a crime level of the location of the user 130, the body camera 132, and/or the radio 128; and/or any other similar details related to the user 130, the body camera 132, and/or the radio 128.

The context determiner 154 may analyze the hub sensor data generated by the hub sensors 148, the communication statuses 140, the device identifiers 152, the device characteristics 160, public data sources, and/or private data sources. Based on this analysis, the context determiner 154 may determine that the user 130 is likely conducting a traffic stop and that the location of the user 130, the radio 128, and/or the body camera 132 has a crime score of three out of ten. This determination may be based on image data captured by the mobile phone 141 and movement data generated by the sensors of the mobile phone 141, the radio 128, and/or the laptop computer 162. This determination may also be based on the movement of the vehicle 127 as well as the movement of the radio 128 relative to the movement of the vehicle 127. This determination may be based on the communications from the body camera 132 before the body camera 132 lost communications with the mobile phone 141. This determination may also be based on the usage of lights and/or sirens and that usage relative to the movement of the vehicle 127, the radio 128, and/or the mobile device 141. This determination may also be based on analysis of public crime data and/or private data that may be related to crime and/or investigations.

The context determiner 154 may generate the context data that indicates the crime score of three out of ten and that the user 130 is likely conducting a traffic stop. The context determiner 154 may provide this context data to the communication status selector 150. In some implementations, the context determiner 154 may continuously update the context of the user 130 and/or any of the connected devices and provide updated context data to the communication status selector 150. The context determiner 154 may perform this continuous analysis in response to an instruction from the hub controller 138 and may provide updated context data to the communication status selector 150. The hub controller 138 may later provide an instruction to the context determiner 154 to cease determining the context of the user 130 and/or any of the connected devices.

The communication status selector 150 may receive the context data. The communication status selector 150 may receive an instruction from the hub controller 138 to determine whether to adjust the communication techniques, protocols, and/or intermediaries for the body camera 132. The instruction may also indicate that if the communication status selector 150 determines to adjust the communication techniques, protocols, and/or intermediaries for the body camera 132, then determine how to adjust the communication techniques, protocols, and/or intermediaries for the body camera 132. The communication status selector 150 may analyze the context data, the communication statuses 140, and/or the device characteristics 160 to determine whether to adjust the communication techniques, protocols, and/or intermediaries for the body camera 132 and, if so, how to adjust the communication techniques, protocols, and/or intermediaries for the body camera 132.

The process that the communication status selector 150 may utilize to determine whether to adjust the communication techniques, protocols, and/or intermediaries for the body camera 132 and, if so, how to adjust the communication techniques, protocols, and/or intermediaries for the body camera 132 will be discussed in more detail with respect to FIG. 2. To summarize, the communication status selector 150 may use one or more models and/or rules to analyze the communication statuses 140, the context data, and the device characteristics 160. In some implementations, the communication status selector 150 may select the rules and/or models based on the context data. In some implementations, the communication status selector 150 may also analyze the hub sensor data generated by the hub sensors 148. In some implementations, the device characteristics 160 may include the radio sensor data generated by the radio sensors 112, the mobile phone sensor data generated by the mobile phone sensors 155, and the body camera sensor data generated by the body camera sensors 166. The rules may specify how to compare the device functions 140, the context data, the device characteristics 160, and/or the hub sensor data. The rules may include various thresholds and/or ranges to compare to the device functions 140, the context data, the device characteristics 160, and/or the hub sensor data. Based on how those thresholds and/or ranges compare to the device functions 140, the context data, the device characteristics 160, and/or the hub sensor data, the rules may specify whether to adjust the communication techniques, protocols, and/or intermediaries for the body camera 132 and, if so, how to adjust the communication techniques, protocols, and/or intermediaries for the body camera 132. The models may be configured to receive the communication statuses 140, the context data, the device characteristics 160, and/or the hub sensor data and output data indicating whether to adjust the communication techniques, protocols, and/or intermediaries for the body camera 132 and, if so, how to adjust the communication techniques, protocols, and/or intermediaries for the body camera 132.

As illustrated in the example of FIG. 1, the communication status selector 150 may access the communication statuses 140, the context data, and the device characteristics 160. The communication statuses 140 may indicate that the radio 128 may communicate using short range radio, radio frequency communications, and cellular communications. The communication statuses 140 may indicate that the mobile phone 141 may communicate using short range radio, radio frequency communications, and cellular communications. The communication statuses 140 may indicate that the mobile phone 141 may communicate using short range radio. The communication statuses 140 may indicate that the body camera 132 is unable to utilize the mobile phone 141 as an intermediary. The device characteristics 160 may indicate that the radio 128 is located at 129 Elm Street, is moving at two miles per hour, has ambient light in the vicinity of the radio 128 of seven thousand lux, and has the battery 118 with a capacity of three thousand milliamp hours with forty percent remaining. The device characteristics 160 that the mobile phone 141 is located at 123 Elm Street, is facing northwest and not moving, has ambient light in its vicinity of five thousand lux, and the battery 157 is a two thousand milliamp battery with seventy percent remaining. The context data may indicate that the user 130 is located in an area with a crime score of three out of ten and the user 130 is likely conducting a traffic stop.

The communication status selector 150 may analyze each of these sources of data and may apply the rules and/or models. The rules and/or models may specify whether to adjust the communication techniques, protocols, and/or intermediaries for the body camera 132 and, if so, how to adjust the communication techniques, protocols, and/or intermediaries for the body camera 132. For example, the communication status selector 150 may indicate that even though the body camera 132 is unable to communicate with the intermediary of the mobile phone 141, the context of the user 130 does not warrant the body camera 132 using another device as an intermediary. The context indicates a traffic stop in a neighborhood with a three out of ten crime score, which is a low risk situation for the user 130. As another example, the communication status selector 150 may indicate that the body camera 132 should utilize the mobile phone 141 as an intermediary. This determination may be based on the radio 128 having at least a threshold percentage of battery power remaining and the time period that that the user 130 has been conducting the traffic stop being greater than a threshold period of time.

In the example of FIG. 1, the communication status selector 150 may analyze the communication statuses 140, the context data, and the device characteristics 160. The communication status selector 150 may determine that the radio 128 should act as an intermediary relay for the body camera 132. In stage E, the communication status selector 150 may generate a relay instruction 126. The relay instruction 126 may indicate for the radio 128 to be an intermediary for the body camera 132. The relay instruction 126 may also indicate for the radio 128 to instruct the body camera 132 to use the radio 128 as an intermediary instead of the mobile phone 141. The communication status selector 150 may provide the relay instruction 126 to the communication interface 146 for output to the radio 128. The communication interface 116 may receive the relay instruction 126. The radio controller 114 may store the relay status 122 in the communication status 120.

The radio controller 114 may generate instructions for the body camera 132. The instructions may indicate to utilize the radio 128 as an intermediary. The body camera 132 may receive the instructions and store intermediary instructions 174 in the communication status 176. The intermediary instructions 174 may indicate to transmit body camera data from the body camera 132 to the radio 128 and to transmit data indicating where the new intermediary should transmit the data. In this case, the body camera 132 may transmit instructions to the radio 128 to transmit the body camera data to the mobile phone 141. The instructions may also include a destination for the body camera data where the mobile phone 141 will transmit the data. In some implementations, the body camera 132 may transmit instructions that indicate a destination that does not utilize a previous intermediary. For example, the instructions may indicate for the radio 128 to transmit body camera data to the laptop computer 162 instead of from the mobile phone 141 to the laptop computer 162.

The communication status selector 150 may also indicate to the communication interface 146 to output the relay instructions 126 to the mobile phone 141. The communication interface 142 may receive the relay instruction 126. The mobile phone controller 156 may store the relay status 135 in the communication status 136.

In some implementations, the relay instruction 126 may include information related to when the relay instruction 126 will expire. In some cases, the relay instruction 126 may be in place until the communication status selector 150 generates an relay instruction that overrides the relay instruction 126. In some cases, the relay instruction 126 may include a time limit. For example, the relay instruction 126 may indicate that the body camera 132 should use the radio 128 as an intermediary for a period of ten minutes. In some cases, the relay instruction 126 may indicate a condition that should be met to cease following the relay instruction 126. For example, the condition may indicate that if the battery 118 drops below a threshold percentage, then the radio 128 should cease operating as an intermediary.

After instructing the various devices on updating the intermediary for the body camera 132, the body camera 132 may collect new data. The body camera controller 168 may instruct the communications interface 164 to transmit the new body camera data and/or transmit body camera data buffered on the body camera 132 while the mobile phone 141 was unavailable to the radio 128. The body camera controller 168 may include destination data with the body camera data. The destination data may indicate where the radio 128 should forward the body camera data.

In stage F, the body camera controller 168 generates the body camera data packet 129 that includes the body camera data and any additional data such as the destination data. The body camera controller 168 provides the body camera data packet 129 to the communications interface 164 that transmits the body camera data packet 129 to the communications interface 116 of the radio 128. The communications interface 164 uses short range radio 165 to transmit the body camera data packet 129 to the communications interface 116 of the radio 128.

The radio controller 114 analyzes the body camera data packet 129. In the case of the body camera data packet 129 including destination instructions, the radio controller 114 may instruct the communications interface 116 to transmit the body camera data packet to the requested destination. In the case of the body camera data packet 129 not including destination instructions, the radio controller 114 may determine the destination of the body camera data packet 129 by accessing the communication status 120 and the relay status 122 that may indicate the destination of packets received from the body camera 132.

In stage G, the radio controller 114 determines that the destination of the body camera data packet 129 is the mobile phone 141. The radio controller 114 may provide a forwarded body camera data packet 131 to the communications interface 116. The radio controller 114 provides instructions to the communications interface 116 to transmit the forwarded body camera data packet 131 to the mobile phone 141. The communications interface 116 may determine the communications technique to use to transmit the forwarded body camera data packet 131 to the mobile phone 141. In this example, the communications interface 116 may use the radio frequency communications 117 or the cellular communications 113. The communications interface 116 transmits the forwarded body camera data packet 131 to the communications interface 142 of the mobile phone 141. The mobile phone 141 may be expecting the forwarded body camera data packet 131 and other forwarded body camera data packets because of the relay status 135 in the communication status 136 indicating that the radio 128 is acting as an intermediary. The mobile phone controller 156 may perform any action on the forwarded body camera data packet 131 that the mobile phone controller 156 would have performed had the body camera 132 transmitted the body camera data directly to the mobile phone 141. This action may include analyzing the body camera data to determine whether to perform any additional actions such as calling for a backup officer, alerting a dispatcher, storing the data in a manner compliant with any regulations, and/or any other similar action.

Figure 2:
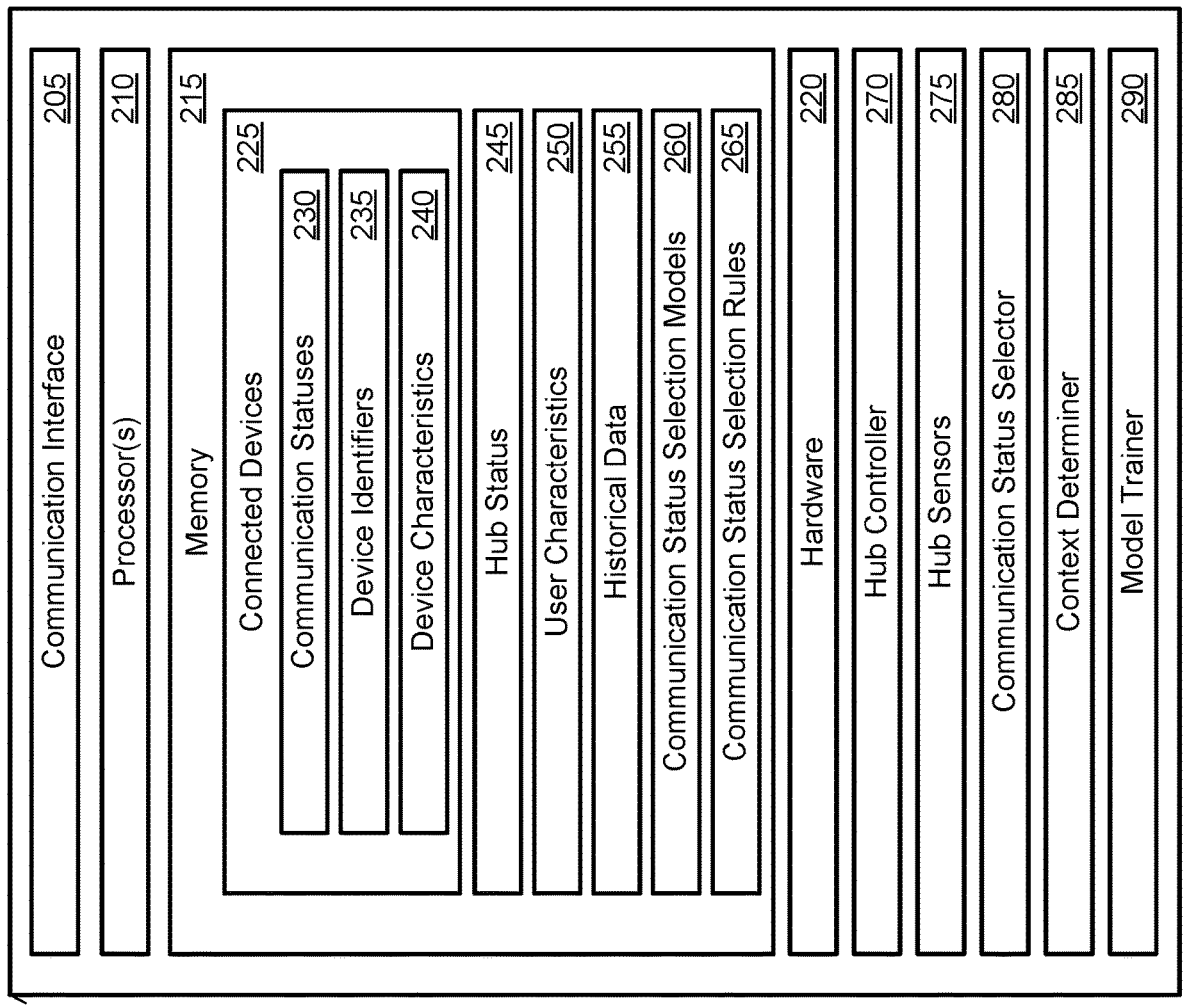
FIG. 2 illustrates an example server that is configured to manage the communication functions of various devices.
Figure 2:
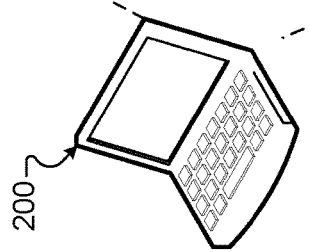

FIG. 2 illustrates an example server that is configured to manage the communication functions of various devices. The device 200 may be any type of computing device that is configured to communicate with other computing devices. The device 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The device 200 may be similar to the laptop computer 162 of FIG. 1. Some of the components of the device may be implemented in a single computing device or distributed over multiple computing devices. Some of the components may be in the form of virtual machines or software containers that are hosted in a cloud in communication with disaggregated storage devices.

The device 200 may include a communication interface 205, one or more processors 210, memory 215, and hardware 220. The communication interface 205 may include communication components that enable the device 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a hub controller 270. The hub controller 270 may be similar to the hub controller 138 of FIG. 1. The hub controller 270 may be configured to perform multiple tasks. Those tasks may include managing the components of the device 200. For example, the hub controller 270 may instruct the communications interface 205 what type of connection to use to communicate with other devices. The hub controller 270 may instruct the communications interface 205 to communicate with a first device using short range radio and communicate with a second device using a cellular network. The tasks of the hub controller 270 may also include determining whether the device 200 should operate as the hub. The hub may be the device that provides instructions to other devices regarding what communication protocols a device should use and whether a device should communicate with an intermediary device. If the device 200 is not operating as the hub, then the device 200 may receive instructions regarding what communication protocols a device should use and whether a device should communicate with an intermediary device.

The hub may change between various devices. There may be several devices that are capable of operating as the hub. Each user may have a group of devices with which the user interacts. These devices may make up the personal area network of the user. For example, a police officer may have a radio, body camera, mobile phone, laptop computer, dashboard camera, storage device, watch, tablet, a built-in computer of a vehicle, and/or any other similar device. Only some of these devices may be configured to operate as a hub. The mobile phone, vehicle computer, and/or laptop computer may be capable of operating as the hub. Each of these devices may include a hub controller that is similar to the hub controller 270.

To select the hub, each of the devices may have a series of rules and a hierarchy to determine which device should be the hub and/or determine which devices should not be the hub. The rules may relate to whether each device can detect other devices. The rules may also relate to the characteristics of each device such as the battery capacity. An example rule may indicate that if the hub controller 270 determines that the device 200 can communicate with each of the devices of the user, then the hub should be the device 200 unless the battery capacity is below thirty percent. If the battery capacity is below thirty percent, then the hub should be the built-in computer of the vehicle. Another example rule may indicate that if the hub controller 270 determines that the device 200 cannot communicate with each of the devices of the user, then the hub should be the built-in computer of the vehicle.

If the device 200 is operating as the hub, then the device 200 may operate as a gateway for communications between the devices and another network. The device 200 or another device acting as the hub may operate as a gateway according to instructions from the function selector 280. For example, the hub controller 270 may instruct a connected device to cease communicating over Wi-Fi and a cellular network and communicate with the device 200 using short range radio. The communications interface 205 may receive the communications from the connected device over short range radio and output the communications using another communications technique to the recipient. Similarly, the communications interface 205 may receive communications intended for the connected device and provide those communications to the connected device over short-range radio.

In some implementations, the hub controller 270 may determine that a device is out of range for communicating with the device 200 using short range radio. In this case, the hub controller 270 may identify another device that can act as an intermediary for the out of range device to communicate with. The intermediary can forward the data from the out of range device to the device 200.

The status of whether the device 200 is operating as the hub may be located in the hub status 245. The hub status 245 may be located in the memory 215 of the device 200. The hub status 245 may include data indicating whether the device 200 is operating as the hub. If the status data indicates that the device 200 is not operating as the hub, then the hub status 245 may include data identifying the device operating as the hub.

The device 200 may include hub sensors 275. The hub sensors 275 may be similar to the hub sensors 148 of FIG. 1. The hub sensors 275 may include an accelerometer, a gyroscope, a GPS receiver, a barometer, an ambient light sensor, a compass, a gravity sensor, a proximity sensor, a magnetometer, image sensor, video sensor, microphone, hygrometer, water sensor, solar flux sensor, ultraviolet light detector, and/or any other similar sensors. The hub sensors 275 may continuously generate sensors data, generate sensor data in response to an instruction from the hub controller 138, generate sensor data in response to an instruction from another device acting as the hub, generate sensor data periodically, generate sensor data in response to an event such as other sensor data satisfying a threshold, and/or generate sensor data in any other similar instance.

The memory 215 may include the connected devices storage 225. The connected devices storage 225 may be similar to the connected devices storage 158 of FIG. 1. In the case of the device 200 acting as the hub, the device 200 may be managing the connected devices. In the case of the device 200 not acting as the hub, the device 200 may store data related to the devices that the device 200 previously managed when the device 200 was acting as the hub. The connected devices storage 225 may also include instructions received from the hub. These instructions may include how and when to use various communication techniques of the device 200 and whether to communicate with any device as an intermediary.

The connected devices storage 225 may include the communication statuses 230, the device identifiers 235, and the device characteristics 240 that may be similar to the communication statuses 140, the device identifiers 152, and the device characteristics 160 of FIG. 1, respectively. The device identifiers 235 may store an identifier of the devices that the device 200 is configured to manage and identifiers of other devices that may be designated as the hub. The device 200 may mange devices that may later be designated as the hub.

The device characteristics 240 may store data related to the devices included in the device identifiers 235. The device characteristics 240 may include data related to features or qualities of the connected devices that may change over time. This change may occur because of usage of the device, movement of the device, environmental changes, changes in nearby devices, and/or any other similar change. In some implementations, the device characteristics 240 may include sensor data generated by sensors of the connected devices. In some implementations, the connected devices may provide the device characteristics periodically, in response to a request from the device 200, in response to an event, and/or any other similar reason. In some implementations, the device characteristics 240 may be unrelated to changes in the device that may occur because of hardware and/or software changes. In some implementations, the device characteristics 240 may indicate a field of view of the cameras, a sensitivity of a microphone, any low light capabilities of the cameras, noise filtering capabilities of the microphone, and/or any other similar feature.

The communication statuses 230 may store data related to the communication capabilities of the devices included in the device identifiers 235. The communication statuses 230 may be similar to the communication statuses 140 of FIG. 1. The device functions 230 may include data related to the communication capabilities of the connected devices that may not change without a modification or addition to the hardware and/or software of the device. The communication statuses 230 may be related to the types of communication modules that the devices have, whether any device has or is currently using or acting as an intermediary, power consumption information for each of the communication techniques of a device, and/or any other similar information related to the communication capabilities of the devices.

The communication statuses 230 may include instructions that other devices have received related to what communication capabilities to utilize, whether to use an intermediary, and/or whether to act as an intermediary. The communication statuses 230 may include data indicating when some of those instructions may expire. Some instructions may not expire. The instructions that may expire may indicate a time limit, a battery charging threshold, a context requirement, and/or any other similar requirement.

The memory 215 may include user characteristics 255. The user characteristics 255 may include data that describe the type of user who is using the device 200 and the connected devices. The type of user may include an occupation of the user, demographic information of the user, an employer of the user, and/or any other similar information. In some implementations, the user may provide the user characteristics 255 to the device 200. The user may provide the user characteristics 255 in response to prompts from the device 200.

The one or more processors 205 may implement a context determiner 285. The context determiner 285 may be similar to the context determiner 154 of FIG. 1. The context determiner 285 may be configured to determine a context of the device 200 and/or any of the connected devices. The context determiner 285 may be configured to analyze the sensor data generated by the hub sensors 275 and/or sensor data generated by sensors of any of the connected devices. The context determiner 285 may also be configured to determine events that may be occurring near or around the device 200 and/or connected devices. The context determiner 285 may determine events by analyzing news sources, websites, internet locations with current event information, first responder dispatch feeds, and/or any other similar information source. These sources may include public sources and private sources. In some implementations, the context determiner 285 may access communications between the device 200 and other devices and other communications between the user of the device 200 and other users. The context determiner 285 may analyze these various sources of information and determine the context of the device 200 and/or any connected device.

In some implementations, the context determiner 285 may be configured to select a context from a predetermined list of contexts. This list of contexts may be dependent on the user of the device 200 or the user of any of the connected devices. For example, the list of contexts may be based on the employer of the user. If the user of the device is a police officer, then the list of contexts may be situations in which the user may be involved during the course of performing duties. The list of contexts may be dependent on the position of the user. For example, a list of contexts may be different for a police supervisor than a police officer. In some implementations, the list of contexts may be dependent on the equipment issued to the user. For example, some members of the police may received marked police vehicles and others may unmarked vehicles. These different types of vehicles may include different types of equipment such as different lights and sirens. The list of contexts for these different groups may depend on the differences between these vehicles.

The one or more processors 205 may implement a communication status selector 280. The communication status selector 280 may be similar to the communication status selector 150 of FIG. 1. The communication status selector 280 may be configured to analyze the communication statuses 230, the device characteristics 240, the sensor data from the hub sensors 275, the sensor data from the connected devices, the context from the context determiner 285, the user characteristics 250, and/or any other similar data to determine whether change the communication techniques and/or intermediaries for any of the connected devices.

The communication status selector 280 may use the communication status selection models 260 and/or the communication status selection rules 265 to analyze these data sources. The communication status selection models 260 and/or the communication status selection rules 265 may output data identifying one or more communication techniques that one or more of the connected devices should use, whether a device should use or change intermediaries, when a device should user or change intermediaries, and/or any other similar communication adjustment. The communication status selector 280 may output those instructions related to these determinations to the corresponding connected device.

The communication status selection rules 265 may include various thresholds, ranges, hierarchies, and/or any other similar comparison tools to determine how the communication interfaces of the connected devices should operate. An example rule may specify that if the user is conducting a traffic stop and the crime score for the location of the stop is greater than a threshold, such as five out of ten, then any devices that have to not have the ability to transmit data to the device 200 should utilize an intermediary. The rule may indicate that is more than one intermediary is available, then the one with the greater battery capacity remaining should be the intermediary until the battery of the selected intermediary is drained to less than the other available intermediaries. Another example rule may specify that if the user is conducting a traffic stop and the crime score for the location of the traffic stop is less than a threshold, then devices that have lost the ability to transmit data to the device 200 may utilize an intermediary if the devices that need an intermediary have a battery capacity above fifty percent. If the crime score is less than three out of ten, then rule may specify bypass utilizing an intermediary for the devices that have lost the ability to transmit data to the device 200.

As another example, a rule may specify that if the user is within a threshold distance of a gunshot that occurred in the last fifteen minutes, then devices that have lost connectivity with the device 200 should utilize an intermediary. This rule may not use battery capacity as a factor. This rule may further specify that if the user manually deactivates a device, then that device should not be reactivated even if the device would automatically be communicating with the device 200 through an intermediary based on the current context.

Another example rule may be related to device 200 acting as a communication hub for the connected devices. The rule may state that the connected devices should communicate with the device 200 using short range radio and the device 200 may transmit communications from the connected devices and receive communications for the connected devices. The device 200 may use higher power communications such as cellular communications. In other words, the device 200 acts as a communication hub for the connected devices because the device 200 communicates on behalf of the connected devices. This rule may indicate that each of the connected devices should be in short range radio range of the device 200 to be applicable.

In some implementations, this example rule may also include references to the battery power of the connected devices and/or the device 200. For example, the rule may not apply if the battery capacity of the connected device is above sixty percent. As another example, the rule may not apply if the battery capacity of the device 200 is below forty percent. As another example, the rule may apply if the device 200 has a hardwired power supply. As another example, the rule may not apply if the signal strength of the device is below a threshold signal strength. As another example, the rule may indicate that one of the connected devices or the device 200 should operate as the communication hub if one of the connected devices or the device 200 has a signal strength that is above a threshold and the other devices have a signal strength that is below a threshold. This rule may be valid for devices that are capable of communicating with additional devices that the ones that the devices are intended to communicate with.

The communication status selection models 260 may be configured to receive the communication statuses 230, the device characteristics 240, the sensor data from the hub sensors 275, the sensor data from the connected devices, the context data from the context determiner 285, the user characteristics 250, and/or any other similar data. The communication status models 260 may output data which connected devices should utilize an intermediary and/or under what conditions those devices should cease to utilize the intermediary.

The communication status models 260 may be trained using machine learning and the historical data 255. The historical data 255 may include previous sensor data collected from the hub sensors, previous sensor data collected from the sensors of the connected devices, previous contexts, previous user characteristics, and/or any other similar data. The historical data 255 may also include data related to instances when the device 200 or another hub may have been managing the communication interfaces of the connected devices and/or periods when the communication capabilities of the connected devices may be limited. The historical data 255 may also include data related to how the user adjusted the communication interfaces in an attempt to move data from one device to another.

The one or more processors 205 may implement the model trainer 290. The model trainer 290 may be configured to analyze the historical data 255. The model trainer 290 may train the communication status selection models 260 using the historical data 255 and machine learning. The model trainer 290 may generate various data samples based on the historical data 255. Each data sample may indicate the state of the previous sensor data collected from the hub sensors, previous sensor data collected from the sensors of the connected devices, previous contexts, previous user characteristics, and/or any other similar data at a point in time. Each data sample may also include a label that indicates the state of the various communication interfaces and/or any intermediaries of the connected devices and/or how the devices were communicating with each other and/or with other devices and networks. The resulting models may be able to receive communication statuses 230, the device characteristics 240, the sensor data from the hub sensors 275, the sensor data from the connected devices, the context from the context determiner 285, the user characteristics 250, and/or any other similar data and output data indicating which whether a connected device should utilize an intermediary, the identity of that intermediary, and, if utilizing the intermediary, when that device should cease utilizing the intermediary. Other recommendations may include how the connected devices should communicate with the device 200 and/or with other devices, which device should operate as the hub, and/or any other similar recommendation.

In some implementations, the communication status selector 280 may implement the recommendation. The model trainer 290 may continue to collect the historical data 255 as the device 200 operates and the connected devices operate. In this case, the model trainer 290 may update the historical data 255 and retrain the function selection models 260 using the updated historical data 255 and machine learning. The communication status selector 280 may utilize the updated function selection models 260 to analyze the communication statuses 230, the device characteristics 240, the sensor data from the hub sensors 275, the sensor data from the connected devices, the context from the context determiner 285, the user characteristics 250, and/or any other similar data that may have updated since the last analysis.

In some implementations, the model trainer 290 may train the communication status selection models 260 without context data. In this case, the data used by the context determiner 285 may be part of the data samples. In this way, the resulting models may be able to receive communication statuses 230, the device characteristics 240, the sensor data from the hub sensors 275, the sensor data from the connected devices, the user characteristics 250, and/or any other similar data and output data indicating which whether a connected device should utilize an intermediary, the identity of that intermediary, and, if utilizing the intermediary, when that device should cease utilizing the intermediary. Other recommendations may include how the connected devices should communicate with the device 200 and/or with other devices, which device should operate as the hub, and/or any other similar recommendation.

The model trainer 290 may also be configured to analyze the historical data 255 and generate the communication status selection rules 265. The model trainer 290 may analyze the historical data 255 for patterns to identify ranges and threshold and other similar comparison techniques to use to analyze the communication statuses 230, the device characteristics 240, the sensor data from the hub sensors 275, the sensor data from the connected devices, the context from the context determiner 285, the user characteristics 250, and/or any other similar data. In some implementations, the model trainer 290 may receive goals from a user that the model trainer 290 should try to achieve when generating the communication status selection rules 265. For example, the goals may include preserving battery life, ensuring audio and video is captured in areas with crime rates above a threshold, and/or any other similar goal. In addition to relating to communication interfaces, the communication status selection rules 265 may be related to selecting a device for a hub. In some implementations, the device 200 may also receive communication status selection rules 265 from a user. These rules may also be related to specific goals of the user and may be specifically tailored for particular devices.

Figure 3:
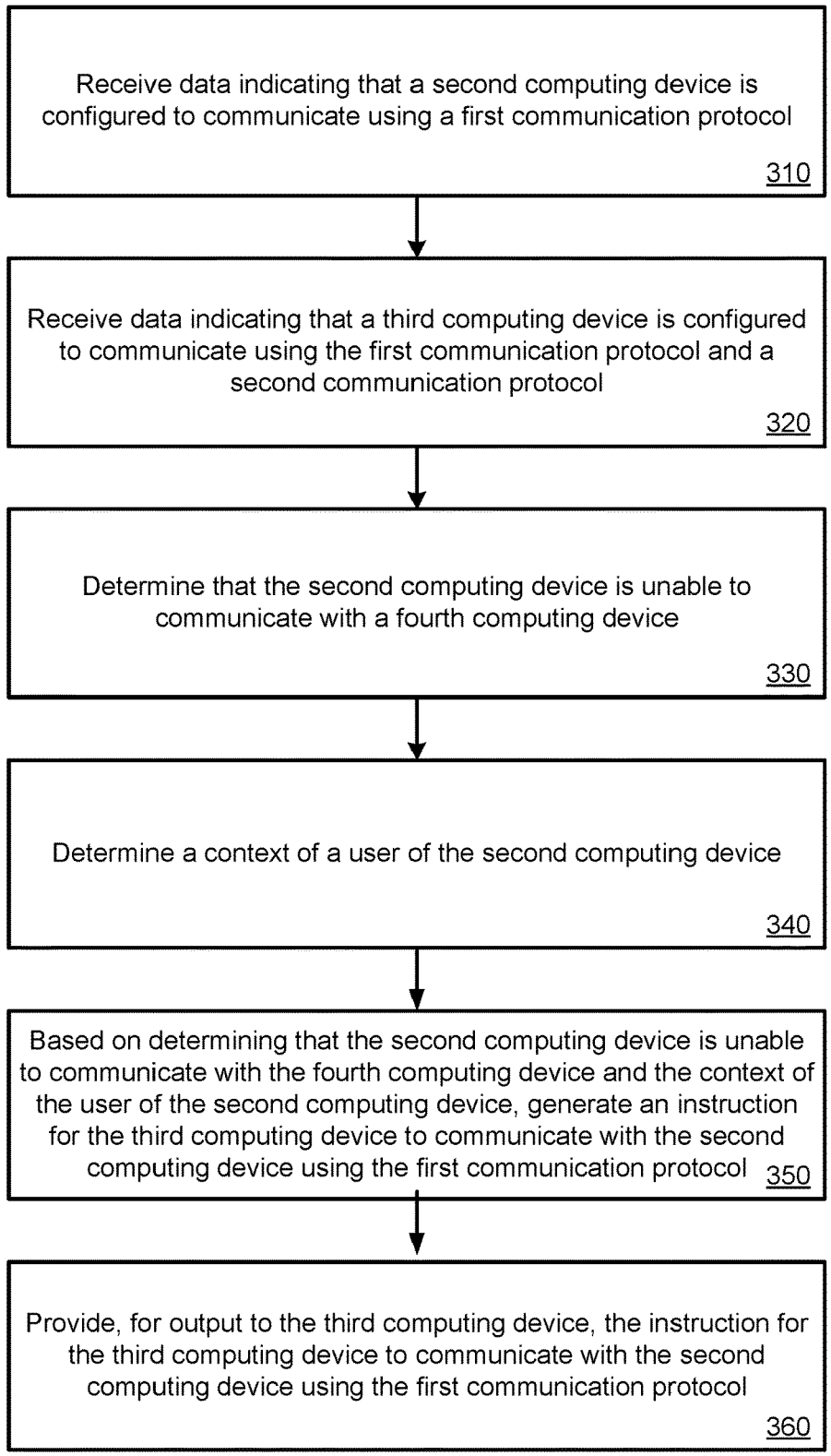
FIG. 3 is a flowchart of an example process for managing the communication functions of various devices.

FIG. 3 is a flowchart of an example process 300 for managing the communication functions of various devices. In general, the process 300 determines the communication capabilities of various devices. The process 300 determines that one of those devices is unable to communicate with some of the other devices. The process 300 determines the context of one or more of the various devices. Based on the context, the process 300 determines whether to implement an alternate communication processes for the device that is unable to communicate with some of the other devices. The process 300 will be described as being performed by the laptop computer 162 of FIG. 1 and will include references to other components in FIG. 1. The process 300 may also be performed by the device 200 of FIG. 2.

The laptop computer 162 receives data indicating that a second computing device is configured to communicate using a first communication protocol (310). For example, the second computing device may be the body camera 132 and the first communication protocol may be a short range radio.

The laptop computer 162 receives data indicating that a third computing device is configured to communicate using the first communication protocol and a second communication protocol (320). For example, the third computing device may be a radio 128. The second communication protocol may be cellular communications.

The laptop computer 162 determines that the second computing device is unable to communicate with a fourth computing device (330). In some implementations, the fourth computing device may be the mobile phone 141. In some implementations, the fourth computing device and the laptop computer 162 may be the same device. In some implementations, the laptop computer 162 may receive, from the fourth computing device, data indicating that the fourth computing device is unable to communicate with the second computing device. The fourth computing device may be unable to communicate with the second computing device using the first communication protocol and the second computing device may be unable to communicate with the fourth computing device using any other communication protocols. The laptop computer 162 may determine that the second computing device is unable to communicate with a fourth computing device based on the data indicating that the fourth computing device is unable to communicate with the second computing device.

The laptop computer 162 determines a context of a user of the second computing device (340). In some implementations, the laptop computer 162 determines the context of the laptop computer 162, the second computing device, the third computing device, and/or the fourth computing device. In some instances, these devices may not be in the vicinity of the user. The context may be based on sensor data collected from any of the devices, sensor data generate by the sensor of the laptop computer 162, data from public sources, data from private sources, functions of the devices, battery capacity of the devices, remaining battery capacity of the devices, and/or any other similar data source.

Based on determining that the second computing device is unable to communicate with the fourth computing device and the context of the user of the second computing device, the laptop computer 162 generates an instruction for the third computing device to communicate with the second computing device using the first communication protocol (350). In some implementations, the laptop computer 162 generates the instructions based on the context of the laptop computer 162, the second computing device, the third computing device, and/or the fourth computing device. In some implementations, the instruction includes a time limit for the third computing device to communicate with the second computing device using the first communication protocol.

In some implementations, the laptop computer 162 may bypass generating the instruction for the third computing device to communicate with the second computing device using the first communication protocol. This may be the case even if the second computing device is unable to communicate with the fourth computing device. The laptop computer 162 may make this determination if the context does not warrant the third computing device to communicate with the second computing device using the first communication protocol. This may be because the situation that the user is in is below a threshold level of danger.

The laptop computer 162 provides, for output to the third computing device, the instruction for the third computing device to communicate with the second computing device using the first communication protocol (360). In some implementations, the laptop computer 162 determines that the second computing device is able to communicate with the fourth computing device using the first protocol. In this case, the laptop computer 162 generates and outputs an instruction for the third computing device to cease communicating with the second computing device using the first communication protocol and an instruction for the fourth computing device to resume communicating with the second computing device using the first communication protocol.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by a first computing device, data indicating that a second computing device is configured to communicate using a first communication protocol;
   receiving, by the first computing device, data indicating that a third computing device is configured to communicate using the first communication protocol and a second communication protocol;
   determining, by the first computing device, that the second computing device is unable to communicate with a fourth computing device;
   determining, by the first computing device, a context of a user of the second computing device;
   based on determining that the second computing device is unable to communicate with the fourth computing device and the context of the user of the second computing device, generating, by the first computing device, an instruction for the third computing device to communicate with the second computing device using the first communication protocol; and
   providing, for output by the first computing device and to the third computing device, the instruction for the third computing device to communicate with the second computing device using the first communication protocol.

2. The method of claim 1, comprising:
- determining, by the first computing device, a context of any of the first, second, third, or fourth computing devices that are not in a vicinity of the user of the second computing device,
- wherein generating the instruction for the third computing device to communicate with the second computing device using the first communication protocol is further based on the context of any of the first, second, third, or fourth computing devices that are not in a vicinity of the user of the second computing device.

3. The method of claim 1, comprising:
- receiving, by the first computing device and from the fourth computing device, data indicating that the fourth computing device is unable to communicate with the second computing device,
- wherein determining that the second computing device is unable to communicate with a fourth computing device is based on the data indicating that the fourth computing device is unable to communicate with the second computing device.

4. The method of claim 1, comprising:
- determining, by the first computing device, that the second computing device is able to communicate with the fourth computing device;
- based on determining that the second computing device is able to communicate with the fourth computing device, generating, by the first computing device, an instruction for the third computing device to cease communicating with the second computing device using the first communication protocol; and
- providing, for output by the first computing device and to the third computing device, the instruction for the third computing device to cease communicating with the second computing device using the first communication protocol.

5. The method of claim 4, comprising:
- after providing the instruction to the third computing device to cease communicating with the second computing device using the first communication protocol:
  - determining, by the first computing device, that the second computing device is unable to communicate with the fourth computing device;
  - determining, by the first computing device, an additional context of the user of the second computing device; and
  - based on determining that the second computing device is unable to communicate with the fourth computing device and the additional context of the user of the second computing device, determining to bypass generating, by the first computing device, an additional instruction for the third computing device to communicate with the second computing device using the first communication protocol.

6. The method of claim 1, wherein the instruction for the third computing device to communicate with the second computing device using the first communication protocol comprises instructions for the third computing device to receive additional data from the from the second computing device using the first communication protocol and to transmit the additional data to the fourth computing device using the second communication protocol.

7. The method of claim 1, wherein the instruction for the third computing device to communicate with the second computing device using the first communication protocol includes a time limit for the third computing device to communicate with the second computing device using the first communication protocol.

8. A system, comprising:
- one or more processors; and
- memory including a plurality of computer-executable components that are executable by the one or more processors to perform a plurality of actions, the plurality of acts comprising:
  - receiving, by a first computing device, data indicating that a second computing device is configured to communicate using a first communication protocol;
  - receiving, by the first computing device, data indicating that a third computing device is configured to communicate using the first communication protocol and a second communication protocol;
  - determining, by the first computing device, that the second computing device is unable to communicate with a fourth computing device;
  - determining, by the first computing device, a context of a user of the second computing device;
  - based on determining that the second computing device is unable to communicate with the fourth computing device and the context of the user of the second computing device, generating, by the first computing device, an instruction for the third computing device to communicate with the second computing device using the first communication protocol; and
  - providing, for output by the first computing device and to the third computing device, the instruction for the third computing device to communicate with the second computing device using the first communication protocol.

9. The system of claim 8, wherein the acts comprise:
- determining, by the first computing device, a context of any of the first, second, third, or fourth computing devices that are not in a vicinity of the user of the second computing device,
- wherein generating the instruction for the third computing device to communicate with the second computing device using the first communication protocol is further based on the context of any of the first, second, third, or fourth computing devices that are not in a vicinity of the user of the second computing device.

10. The system of claim 8, wherein the acts comprise:
- receiving, by the first computing device and from the fourth computing device, data indicating that the fourth computing device is unable to communicate with the second computing device,
- wherein determining that the second computing device is unable to communicate with a fourth computing device is based on the data indicating that the fourth computing device is unable to communicate with the second computing device.

11. The system of claim 8, wherein the acts comprise:
- determining, by the first computing device, that the second computing device is able to communicate with the fourth computing device;
- based on determining that the second computing device is able to communicate with the fourth computing device, generating, by the first computing device, an instruction for the third computing device to cease communicating with the second computing device using the first communication protocol; and
- providing, for output by the first computing device and to the third computing device, the instruction for the third computing device to cease communicating with the second computing device using the first communication protocol.

12. The system of claim 11, wherein the acts comprise:
after providing the instruction to the third computing device to cease communicating with the second computing device using the first communication protocol:
  determining, by the first computing device, that the second computing device is unable to communicate with the fourth computing device;
  determining, by the first computing device, an additional context of the user of the second computing device; and
  based on determining that the second computing device is unable to communicate with the fourth computing device and the additional context of the user of the second computing device, determining to bypass generating, by the first computing device, an additional instruction for the third computing device to communicate with the second computing device using the first communication protocol.

13. The system of claim 8, wherein the instruction for the third computing device to communicate with the second computing device using the first communication protocol comprises instructions for the third computing device to receive additional data from the from the second computing device using the first communication protocol and to transmit the additional data to the fourth computing device using the second communication protocol.

14. The system of claim 8, wherein the instruction for the third computing device to communicate with the second computing device using the first communication protocol includes a time limit for the third computing device to communicate with the second computing device using the first communication protocol.

15. One or more non-transitory computer-readable media of a computing device storing computer-executable instructions that upon execution cause one or more computers to perform acts comprising:
  receiving, by a first computing device, data indicating that a second computing device is configured to communicate using a first communication protocol;
  receiving, by the first computing device, data indicating that a third computing device is configured to communicate using the first communication protocol and a second communication protocol;
  determining, by the first computing device, that the second computing device is unable to communicate with a fourth computing device;
  determining, by the first computing device, a context of a user of the second computing device;
  based on determining that the second computing device is unable to communicate with the fourth computing device and the context of the user of the second computing device, generating, by the first computing device, an instruction for the third computing device to communicate with the second computing device using the first communication protocol; and
  providing, for output by the first computing device and to the third computing device, the instruction for the third computing device to communicate with the second computing device using the first communication protocol.

16. The media of claim 15, wherein the acts comprise:
  determining, by the first computing device, a context of any of the first, second, third, or fourth computing devices that are not in a vicinity of the user of the second computing device,
  wherein generating the instruction for the third computing device to communicate with the second computing device using the first communication protocol is further based on the context of any of the first, second, third, or fourth computing devices that are not in a vicinity of the user of the second computing device.

17. The media of claim 15, wherein the acts comprise:
  receiving, by the first computing device and from the fourth computing device, data indicating that the fourth computing device is unable to communicate with the second computing device,
  wherein determining that the second computing device is unable to communicate with a fourth computing device is based on the data indicating that the fourth computing device is unable to communicate with the second computing device.

18. The media of claim 15, wherein the acts comprise:
  determining, by the first computing device, that the second computing device is able to communicate with the fourth computing device;
  based on determining that the second computing device is able to communicate with the fourth computing device, generating, by the first computing device, an instruction for the third computing device to cease communicating with the second computing device using the first communication protocol; and
  providing, for output by the first computing device and to the third computing device, the instruction for the third computing device to cease communicating with the second computing device using the first communication protocol.

19. The media of claim 15, wherein the instruction for the third computing device to communicate with the second computing device using the first communication protocol comprises instructions for the third computing device to receive additional data from the from the second computing device using the first communication protocol and to transmit the additional data to the fourth computing device using the second communication protocol.

20. The media of claim 15, wherein the instruction for the third computing device to communicate with the second computing device using the first communication protocol includes a time limit for the third computing device to communicate with the second computing device using the first communication protocol.

* * * * *